United States Patent Office 3,518,231
Patented June 30, 1970

3,518,231
PROCESS FOR PREPARING COPOLYMERS OF TRIOXANE AND A COMONOMER CONTAINING EPOXY AND DIOXOLANO GROUPS
Karl-Heinz Häfner, Bad Orb, and Harald Cherdron, Wiesbaden, Germany, assignors to Farbwerke Hoechst Aktiengesellschaft vormals Meister Lucius & Bruning, Frankfurt am Main, Germany, a corporation of Germany
No Drawing. Filed Jan. 17, 1968, Ser. No. 698,442
Claims priority, application Germany, Jan. 26, 1967, F 51,351
Int. Cl. C08g *1/00, 1/04, 1/14*
U.S. Cl. 260—67           8 Claims

ABSTRACT OF THE DISCLOSURE

Copolymers of trioxane are prepared by a cationic polymerization of a mixture of trioxane, cyclic ethers or cyclic acetals having at least two vicinal carbon atoms in the nucleus, and bi-functional compounds containing epoxy- and dioxolano groups as the functional groups, at temperatures in the range of from −50° to +110° C. The products obtained are especially useful for preparing thermoplastic adhesives and as dispersion bases.

---

The present invention provides copolymers of trioxane and a process for preparing them.

It is known that, under the action of cation-active catalysts, trioxane and cyclic ethers as well as cyclic acetals having at least two vicinal carbon atoms in the nucleus, form copolymers which are stable against alkaline degradation and which are valuable plastic materials because of their good mechanical and physical properties. Copolymers of this type, however, have the disadvantage that, apart from chemical reactions at the end of the polymer chain, they cannot be subsequently modified in the chain itself by chemical reactions. Furthermore, it is known that trioxane can be copolymerized with bi-functional compounds such as cyclohexane-1.2-oxide-4,4-dioxymethylene - formal, or β.γ-epoxypropoxy-β'.γ'-carbonatopropoxy-alkanes. This process provides polymers which are already crosslinked either under the polymerization conditions or during the subsequent tempering.

We have now found that copolymers can advantageously be prepared from 60 to 99.99% by weight of trioxane, from 0.01 to 20% by weight of comonomers containing epoxy- and dioxolano groups, and from 0 to 20% by weight of cyclic ethers in the presence of cation-active catalysts at temperatures in the range of from −50 to +110° C., by using compounds containing epoxy- and dioxolano groups and corresponding to the formula

[Structure: bicyclic compound with $R_1$, $R_2$, $R_3$, $R_4$ substituents, $(CH_2)_n$, and dioxolano group $O-CH_2-CH-O-CH_2$]

in which $R_1$ to $R_4$ are identical or different and each represents a hydrogen atom or an alkyl radical containing from 1 to 3 carbon atoms, and $n$ represents zero or an integer of from 1 to 4.

Suitable compounds containing epoxy- and dioxolano groups are, for example, 4 - dioxolano - 7 - oxabicyclo [4.1.0]-heptane of the formula

[Structure of 4-dioxolano-7-oxabicyclo[4.1.0]-heptane]

and its 1-methyl-, 3-methyl- and 6-methyl-derivatives; 6-dioxolano-3-oxatricyclo[3.2.1.0$^{2.4}$]-octane of the formula

[Structure]

and its 6-methyl-derivative; furthemore 6-dioxolano-3-oxatricyclo-[3.2.2.0$^{2.4}$]-nonane of the formula

[Structure with $(CH_2)_2$]

10-dioxolano-3-oxatricyclo[3.3.2.0$^{2.4}$]-decane of the formula

[Structure with $(CH_2)_3$]

and 11 - dioxolano-3-oxatricyclo[4.3.2.0$^{2.4}$]-undecane of the formula

[Structure with $(CH_2)_4$]

In addition to trioxane and compounds containing epoxy- and dioxolano groups, cyclic ethers or cyclic acetals may be used in amounts ranging from 0 to 20% by weight, calculated on the whole monomer mixture. Cyclic ethers or cyclic acetals are compounds of the general formula $$\begin{array}{c} R_1 \\ R_2-C-O \\ R_3-C-(R_5)_n \\ R_4 \end{array}$$

in which $R_1$ to $R_4$ are identical or different and each represents a hydrogen atom, an alkyl radical or a halogen-substituted alkyl radical and $R_5$ represents a methylene or oxy-methylene radical or a methylene or oxy-methylene radical substituted by alkyl- or halogen-alkyl groups, $n$ being zero or an integer of from 1 to 3, or $R_5$ represents the radical $$-\left(O-CH_2-CH_2\right)_m-OCH_2-$$

$n$ being 1 and $m$ being an integer of from 1 to 3. The alkyl radicals mentioned above contain from 1 to 5 carbon atoms and may be substituted by 0 to 3 halogen atoms, preferably chlorine atoms.

Among the suitable cyclic ethers or cyclic acetals, there are preferred, for example, ethylene oxide, propylene oxide, epichlorhydrin, 1,3 - dioxolane, diethylene - glycol formal and oxacyclobutane.

Instead of cyclic ethers or cyclic acetals coming within the above-mentioned formula, there may also be used cyclic ethers or cyclic acetals which are derived from 1.4-butane-diol or 1.4-butene-diol, for example 1.4-butene-diol formal, 1.4-butane-diol diglycidyl ether and 1.4-butane-diol formal.

The process of the invention yields copolymers in which the comonomer containing the epoxy- and dioxolano groups, is incorporated into the macromolecular chain. Depending on the reaction conditions chosen, among which the reaction temperature and the concentrations of the catalyst and the comonomer may be modified or under which the polymerization may be carried out in bulk, in suspension or in solution, there are obtained products which are incorporated into the macromolecular chain either only by means of the epoxy grouping or by means of the epoxy- and dioxolano group. In the latter case, crosslinked polymers are obtained. Under all the reaction conditions chosen, the dioxolane nucleus is split up during the polymerization reaction, whereupon the copolymers which are not crosslinked, comprise polymers containing free aldehyde groups which have been established by infrared spectroscopy. In the crosslinked polymers little or no carbonyl bands can be established by infrared spectroscopy. For example, the polymerization of a mixture of monomers of 96 grams of trioxane, 2 grams of ethylene oxide and 2 grams of 4-dioxolano-7-oxabicyclo [4.1.0]-heptane, effected in bulk at 65° C. in the presence of 16 milligrams of $BF_3$, yields copolymers having a melt index $i_2$ of 20.6 grams per 10 minutes (at 190° C.) and containing free aldehyde groups. When the same monomer mixture is polymerized at 70° C. in the presence of 24 milligrams of $BF_3$, there is obtained a crosslinked polymer which hardly shows carbonyl bands in the infrared spectrum.

The following examples serve to illustrate the present invention, but they are not intended to limit it thereto.

EXAMPLE 1

1.5 milliliters of $BF_3$-di-n-butyl-etherate, as a catalyst (diluted to a ratio of 1:40 with cyclohexane) were added to a batch consisting of 97 grams of trioxane, 2 grams of ethylene oxide and 1 gram of 4-dioxolano-7-oxabicyclo [4.1.0]-heptane. The batch was polymerized in a thermally constant bath at a temperature of 65° C. in a closed vessel. The polymerization time was 60 minutes. The polymer block obtained was ground and treated for 30 minutes at a temperature of 150° C. in benzyl alcohol containing 1% by weight of triethanol amine, for eliminating the unstable terminal groups and the residual monomers. When cool, the polymer was filtered with suction, boiled several times with methanol and dried in vacuo at a temperature in the range of from 50 to 70° C. The yield of the polymers was 60 grams. The melt index $i_2$ was 20.6 grams per 10 minutes (ASTM–D 1238–52 T).

In a manner analogous to that of Example 1, the following experiments were carried out:

| Example | Trioxane (grams) | Ethylene oxide (grams) | Comonomer | Temperature (° C.) | Catalyst (milligram) of $BF_3$ | Yield (gram) | Melt index gram/10 min. |
|---|---|---|---|---|---|---|---|
| 2 | 96 | 2 | 2 grams of 4-dioxolano-7-oxabicyclo-[4.1.0]-heptane. | 65 | 16 | 62 | 70 |
| 3 | 95 | 2 | 3 grams of 4-dioxolano-7-oxabicyclo-[4.1.0]-heptane. | 70 | 24 | 49 | 1.1 |
| 4 | 96 | 2 | 2 grams of 4-dioxolano-7-oxabicyclo-[4.1.0]-heptane. | 70 | 24 | 53 | (¹) |
| 5 | 93 | 2 | 5 grams of 4-dioxolano-7-oxabicyclo-[4.1.0]-heptane. | 70 | 32 | 5.0 | (¹) |
| 6 | 96 | 2 | 2 grams of 1-methyl-4-dioxolano-7-oxabicyclo-[4.1.0]-heptane. | 65 | 16 | 54 | 25 |
| 7 | 97 | 2 | 1 gram of 6-dioxolano-3-oxatricyclo-[3.2.2.0²·⁴]-nonane. | 75 | 16 | 58 | (¹) |

¹ Not measurable; crosslinked.

The cationic polymerization may be carried out by well-known processes in the melt, in solution or in suspension. As solvents or suspending agents there are mentioned aliphatic or cyclo-aliphatic hydrocarbons containing from 5 to 18 carbon atoms, which are inert towards the monomers and the catalyst, for example n-hexane or cyclohexane, or halogen-substituted aliphatic hydrocarbons containing from 1 to 10 carbon atoms, for example methylene chloride. The polymerization is, however, preferably carried out in solution or in the melt at temperatures in the range of from −30 to +110° C.

For starting the polymerization carried out according to the present invention, there are especially suitable Lewis-acids (defined by Kortüm, Lehrbuch der Elektrochemie, Weisbaden 1948, pages 300 and 301), preferably boron trifluoride. Boron trifluoride is preferably used in the form of its complex compounds, for example an etherate, an oxonium fluoroborate or a substituted aryl-diazonium fluoroborate. The concentration of the catalysts depends, above all, on their activity as initiators and may be in the range of from 0.0001 to 10.0% by weight, preferably from 0.001 to 1.0% by weight, calculated on the whole monomer mixture.

For eliminating the unstable terminal groups, the copolymers of the invention may be subjected to a known alkaline degradation (disclosed in Belgian Pat. No. 617,-897).

It is advantageous to add to the copolymers, light stabilizers and oxidation stabilizers.

Depending on the reaction conditions chosen, copolymers which can be processed theremoplastically or which are crosslinked, can be obtained without having to add a crosslinking agent in a subsequent reaction step. These products are especially suitable for preparing thermoplastic adhesives or as dispersion bases. The copolymers containing free aldehyde groups may be modified in various manners by subsequent reactions.

The following examples were carried out in a manner analogous to that of Example 1 in the presence of 100 milliliters of methylene chloride as a solvent:

| Example | Trioxane (grams) | Ethylene oxide (grams) | 4-dioxolano-7-oxabicyclo-[4.1.0]-heptane (grams) | Temperature (° C.) |
|---|---|---|---|---|
| 8 | 10 | | 2 | 0 |
| 9 | 20 | | 0.4 | 0 |
| 10 | 20 | 0.4 | 0.4 | 0 |

| Example | Catalyst $BF_3$ (milligram) | Yield (gram) | Melt index (gram/10 min.) | Reduced specific viscosity (dl./gram) |
|---|---|---|---|---|
| 8 | 640 | 8 | 19.1 | |
| 9 | 320 | 6.5 | | 0.08 |
| 10 | 320 | 9.5 | | 0.07 |

The reduced specific viscosity was determined by dissolving 50 milligrams of the polymer in 10 milliliters of butyro-lactone containing 0.2% of diphenylamine, at 140° C. and measuring the viscosity at this temperature.

What is claimed is:

1. A process for preparing polyoxymethylene copolymers by polymerizing in the presence of a cationic catalyst and at a temperature −50° to +110° C. a reaction mixture comprising from 60% to 99.9% by weight of trioxane, from 0 to 20% by weight of a cyclic ether of the formula

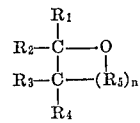

in which $R_1$ to $R_4$ may be the same or different and represent hydrogen or an alkyl group of 1 to 5 carbon atoms which may be susbstituted by 0 to 3 halogen atoms; $n$ is 0 to 3; $R_5$ is selected from methylene and oxymethylene radicals which may be substituted by alkyl or haloalkyl groups having 1 to 5 carbon atoms and 0 to 3 halogen atoms, or when $n=1$, $R_5$ may be the radical

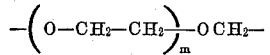

in which $m$ is 1 to 3; and from 0.01 to 20% by weight of a bifunctional comonomer of the formula

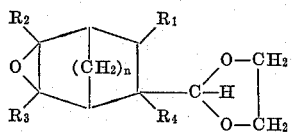

in which $R_1$ to $R_4$ represent hydrogen or an alkyl group of 1 to 3 carbon atoms and $n$ is 0 to 4.

2. A process according to claim 1 in which said bifunctional compound is 4-dioxolano-7-oxabicyclo[4.1.0]-heptane or its methyl derivatives.

3. A process according to claim 1 in which said bifunctional compound is selected from 6-dioxolano-3-oxatricyclo [3,2,1,0$^{2.4}$] octane, 6 - dioxolano-3-oxatricyclo [3.2.2.0$^{2.4}$] nonane, 10-dioxolano-3-oxatricyclo-[3.3.2.0$^{2.4}$] decane, 11-dioxolano-3-oxatricyclo [4.3.2.0$^{2.4}$]-undecane and their methyl derivatives 4. A process according to claim 1 in which the cyclic ether is selected from ethylene oxide, propylene oxide, epichlorhydrin, 1,3-dioxolane, diethylene glycol formal and oxacyclobutane.

5. A polyoxymethylene copolymer prepared by the process of claim 1.

6. A polyoxymethylene copolymer prepared by the process of claim 2.

7. A polyoxymethylene copolymer prepared by the process of claim 3.

8. A polyoxymethylene copolymer prepared by the process of claim 4.

References Cited

UNITED STATES PATENTS

| 3,252,939 | 5/1966 | Small. |
| 3,306,877 | 2/1967 | Schott et al. |
| 3,344,120 | 9/1967 | Rosen _____ 260—73 |
| 3,367,916 | 2/1968 | Von Der Emden et al. |
| 3,373,136 | 3/1968 | Wicker _____ 260—45.9 |
| 3,384,620 | 5/1968 | Sidi. |
| 3,422,073 | 1/1969 | Pregaglia et al. |

WILLIAM H. SHORT, Primary Examiner

L. M. PHYNES, Assistant Examiner

U.S. Cl. X.R.

260—45.9, 45.95